US012626481B2

(12) United States Patent
Courteaux et al.

(10) Patent No.: US 12,626,481 B2
(45) Date of Patent: May 12, 2026

(54) LIGHT FIELD RENDERING

(71) Applicants: UNIVERSITEIT GENT, Ghent (BE); IMEC VZW, Leuven (BE)

(72) Inventors: Martijn Courteaux, Ghent (BE); Glenn Van Wallendael, Gentbrugge (BE); Peter Lambert, Torhout (BE)

(73) Assignees: UNIVERSITEIT GENT, Ghent (BE); IMEC VZW, Leuven (BE)

( * ) Notice: Subject to any disclaimer, the term of this patent is extended or adjusted under 35 U.S.C. 154(b) by 405 days.

(21) Appl. No.: 17/923,181

(22) PCT Filed: May 5, 2021

(86) PCT No.: PCT/EP2021/061785
§ 371 (c)(1),
(2) Date: Nov. 3, 2022

(87) PCT Pub. No.: WO2021/224298
PCT Pub. Date: Nov. 11, 2021

(65) Prior Publication Data
US 2023/0290107 A1    Sep. 14, 2023

(30) Foreign Application Priority Data

May 6, 2020    (EP) ..................................... 20173095

(51) Int. Cl.
| | |
|---|---|
| *G06V 10/60* | (2022.01) |
| *G06T 3/40* | (2024.01) |
| *G06T 7/50* | (2017.01) |
| *G06T 15/50* | (2011.01) |
| *G06V 10/56* | (2022.01) |

(52) U.S. Cl.
CPC ................ *G06V 10/60* (2022.01); *G06T 3/40* (2013.01); *G06T 7/50* (2017.01); *G06V 10/56* (2022.01)

(58) Field of Classification Search
CPC .......... G06V 10/60; G06V 10/56; G06T 3/40; G06T 7/50; G06T 15/506
See application file for complete search history.

(56) References Cited

U.S. PATENT DOCUMENTS

| | | | |
|---|---|---|---|
| 2013/0147862 A1* | 6/2013 | Atkins | .................... G09G 5/008 |
| | | | 345/690 |
| 2019/0241198 A1* | 8/2019 | Mori | ......................... G08G 1/16 |

OTHER PUBLICATIONS

Zhao, Yang, Abhishek K. Shrivastava, and Kwok Leung Tsui. "Regularized Gaussian mixture model for high-dimensional clustering." IEEE transactions on cybernetics 49.10 (2018): 3677-3688. (Year: 2018).*

(Continued)

*Primary Examiner* — Amandeep Saini
*Assistant Examiner* — Andrew S Budislalich
(74) *Attorney, Agent, or Firm* — Workman Nydegger

(57) ABSTRACT

A method for light field rendering includes: obtaining an n-dimensional mixture model, with n a natural number equal to or larger than 4, of a light field. The model is made of kernels wherein each kernel represents light information and is expressed by parameter values; mathematically reducing the n-dimensional mixture model into a 2-dimensional mixture model of an image given a certain point of view, wherein the 2-dimensional model is also made of kernels; rendering a view in a pixel domain from the 2-dimensional model made of kernels.

15 Claims, 4 Drawing Sheets

(56) References Cited

OTHER PUBLICATIONS

R. Verhack, G. Van Wallendael, M. Courteaux, P. Lambert and T. Sikora, "Progressive Modeling of Steered Mixture-of-Experts for Light Field Video Approximation," 2018 Picture Coding Symposium (PCS), San Francisco, CA, USA, 2018, pp. 268-272, doi: 10.1109/PCS.2018.8456242. (Year: 2018).*

Verhack et al., "Progressive Modeling of Steered Mixture-of-Experts for Light Field Video Approximation," 2018 Picture Coding Symposium (PCS), IEEE, Jun. 24, 2018, pp. 268-272.

Avramelos et al., "Steered Mixture-of-Experts for Light Field Video Coding," Proceedings of SPIE, vol. 10752, Sep. 17, 2018, 12 pages.

Isaksen et al., "Dynamically Reparameterized Light Fields", Proceedings of the 27th Annual Conference on Computer Graphics and Interactive Techniques, Jul. 1, 2000, pp. 297-306.

Search Report from corresponding European Application No. 20173095.9, Nov. 25, 2020.

International Search Report from PCT Application No. PCT/EP2021/061785, Jul. 15, 2021.

* cited by examiner

100

200

LIGHT FIELD RENDERING

FIELD OF THE INVENTION

The invention relates to the field of light field rendering. More specifically it relates to the field of light field rendering based on kernel-based light field models.

BACKGROUND OF THE INVENTION

A light field (LF) is a mathematical concept in the form of a vector field that represents the color of incident light rays. It thus characterizes the light information in a region. Light field rendering is the process of rendering views from an arbitrary vantage point based on camera-captured data. The rendering consists of positioning a virtual camera and virtually capturing these light rays as if it was taking a picture from that position, as shown in FIG. 1.

Using the pipeline shown in FIG. 2, these views can be rendered with added functionality. Granular depth maps 22 can be constructed from the raw LF data 21 by estimation on pixel data 11 and can be used for granular depth-based filtering, e.g. removing background or changing pixel values based on their depth. Editing 12 of the raw LF data (LF) can be done on a view per view basis. Light field rendering 23 can be done using the depth map 22 and the raw LF data 21. Thus a rendered view 24 can be obtained. Virtual apertures can be simulated combined with changing the virtual focal plane in order to achieve depth-of-field effects at render time (A. Isaksen, L. McMillan, and S. J. Gortler, "Dynamically reparameterized light fields," in Proceedings of the 27th annual conference on Computer graphics and interactive techniques—SIGGRAPH '00, 2000, pp. 297-306). Some problems with working on discrete data are: hole filling and interpolation necessary, all relevant views in memory, ghosting artefacts.

In practice, light fields can be represented by an extremely dense set of 2-D images, e.g. subaperture images or views. Light field rendering then consists of merging subsets of pixels from several captured views. These pixels correspond to light rays under a certain angle.

Additionally, kernel-based methods have been proposed that create a continuous statistical model of the light field data, e.g. Steered Mixture-of-Experts (R. Verhack, T. Sikora, G. Van Wallendael, and P. Lambert, "Steered Mixture-of-Experts for Light Field Images and Video: Representation and Coding," IEEE Transactions on Multimedia, Volume 22, Issue 3, March 2020). Such models provide a continuous representation, which implicitly solves interpolation, hole-filling and ghost-artefacts during rendering. The kernels are seen as multidimensional image atoms and as coherent bundles of light, typically corresponding to a part of an entity in a scene. The parameters of the model are: the number of kernels and the parameters for each kernel. They have a shape which spans along all coordinate dimensions in which the light field is represented. These kernels describe the color information in this region in the coordinate domain. This color information per kernel is in the form of a function which maps the coordinate space onto the color space.

This elevates some of the problems of working with discrete sample data, e.g. interpolation between multiple views. Furthermore, continuous depth-information is implicitly embedded in the model. Therefore, the light field rendering pipeline can be solely dependent on such a kernel-based light field model.

The light field rendering step remains relatively computationally heavy, and memory demanding, as the light field rendering algorithms operate on pixel data, and thus have to reconstruct the pixel data of the original views. When, moreover, working with the raw LF data, i.e. in the pixel domain, it is required to know which pixels belong together. Furthermore, after an edit, the model needs to be rebuilt. Editing light fields is cumbersome as results needs to be consistent over all possible views.

There is therefore a need for methods for light filed rendering which are less computationally heavy and/or which require less memory.

SUMMARY OF THE INVENTION

It is an object of embodiments of the present invention to provide a good method and device for light field rendering.

The above objective is accomplished by a method and device according to the present invention.

In a first aspect embodiments of the present invention relate to a method for light field rendering. The method comprises obtaining an n-dimensional mixture model of a light field, with n a natural number equal to or larger than 4, wherein the model is made of kernels wherein each kernel represents light information and is expressed by parameter values, mathematically reducing the n-dimensional mixture model into a 2-dimensional mixture model of an image given a certain point of view, wherein the 2-dimensional model is also made of kernels, rendering a view in a pixel domain from the 2-dimensional model made of kernels.

It is an advantage of embodiments of the present invention that rendering is simplified by calculating a 2-dimensional model of an image given a certain point of view. This can be an arbitrary 3-dimensional viewpoint. It is, moreover, an advantage that this 2-dimensional model can be obtained without the need for interpolation or light field rendering since it is not required to change between the pixel domain and the kernel domain.

It is an advantage of embodiments of the present invention that the view in the pixel domain is obtained from the 2-dimensional model as this is less computationally intensive than when it would have been obtained from the n-dimensional model.

In a second aspect embodiments of the present invention relate to a device for light field rendering. Such a device is configured for executing a method in accordance with embodiments of the present invention.

In a third aspect embodiments of the present invention relate to a computer program product for, if implemented on a processing unit, performing a method according to embodiments of the present invention.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
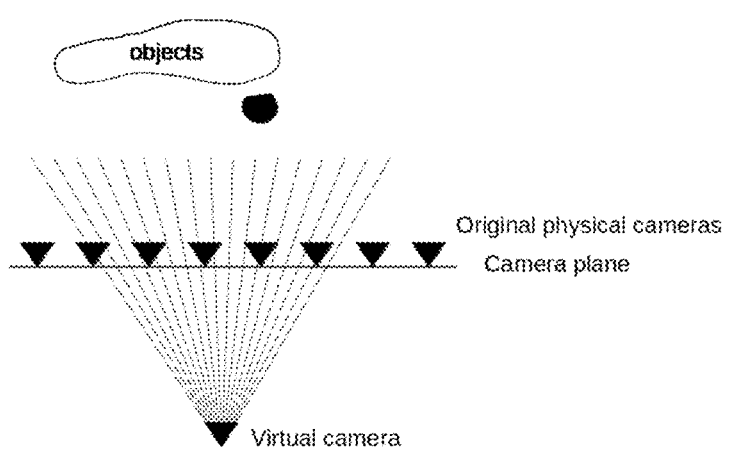
FIG. 1 illustrates the principle of light field rendering.
Figure 2:
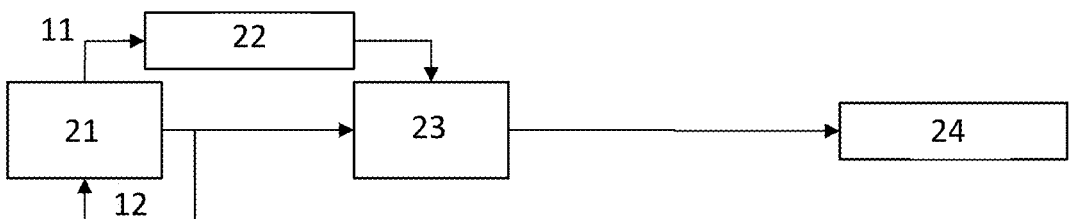
FIG. 2 shows a pipeline for traditional light field rendering in conjunction with depth-information.

Any reference signs in the claims shall not be construed as limiting the scope. In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Figure 4:
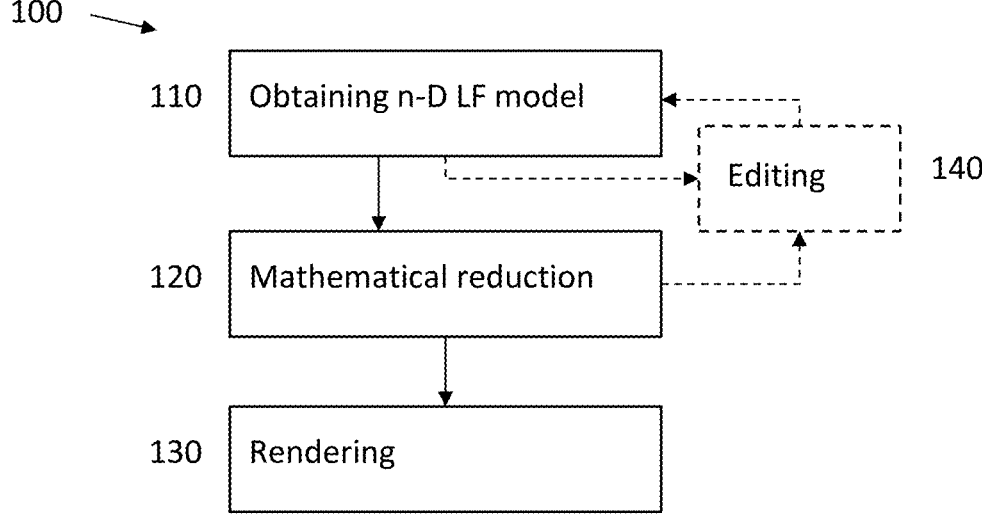
FIG. 4 shows a flow chart of an exemplary method in accordance with embodiments of the present invention.

In a first aspect embodiments of the present invention relate to a method 100 for light field rendering. An exemplary flow chart of such a method is shown in FIG. 4.

The method comprises obtaining 110 an n-dimensional mixture model of a light field, with n a natural number equal to or larger than 4. When n is equal to 4 the mixture model is a model of a light field. By adding the time dimension, a mixture model of a light field video is obtained. The model is made of kernels, and each kernel represents light information and is expressed by parameter values.

The method, moreover, comprises mathematically reducing 120 the n-dimensional mixture model into a 2-dimensional mixture model of an image given a certain point of view (also referred to as a virtual viewpoint), wherein the 2-dimensional mixture model is also made of kernels.

The method, moreover, comprises rendering 130 a view in a pixel domain from the 2-dimensional mixture model made of kernels.

In embodiments of the present invention the n-dimensional model of the light field is a multidimensional continuous statistic model which is built from the pixel information of different cameras. It is an advantage of embodiments of the present invention that the redundancy which is present in the pixel information is reduced when representing it as a mixture model which may for example be a Steered Mixture of Experts. The mathematical reduction 120 is done given a certain point of view. The point of view is not restricted to one of the viewpoints of the cameras, but may be any virtual viewpoint, even located outside of the plane or surface formed by the cameras. In embodiments of the present invention this point of view is a virtual viewpoint which is outside a plane formed by the cameras.

In embodiments of the present invention a model is composed by a set of kernels (also referred to as components). A kernel is larger than a pixel and less kernels are required than pixels for describing the image, or video, or light field, or light field video. Hence, redundancy can be reduced by modeling multiple views at once using kernels that exploit this redundancy across the different views (and across time, when applicable). A kernel may comprise a color gradient or other (more complex) mappings between coordinate space and color space. In the model each kernel may have a gradient and a region of influence defined by weights.

Figure 3:
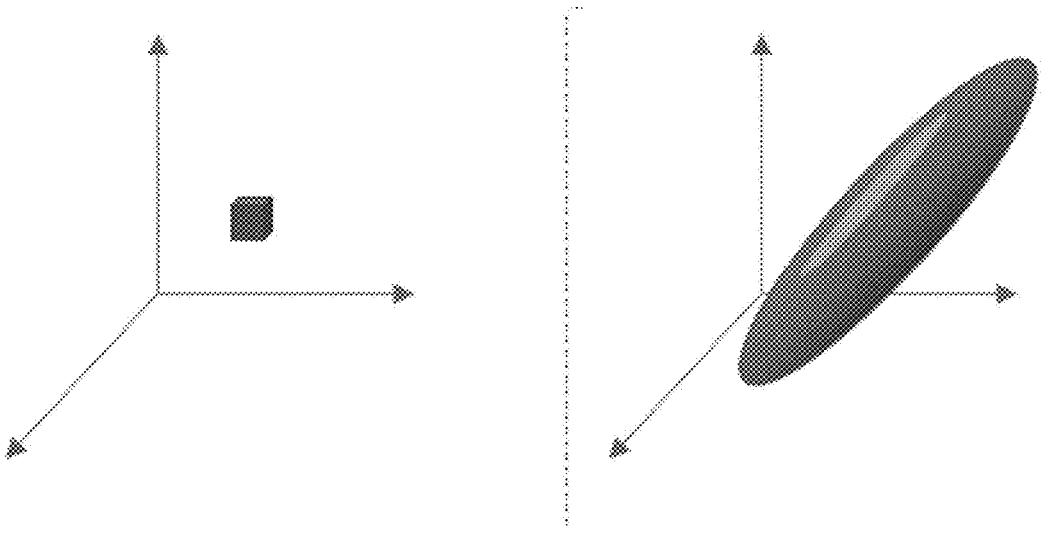
FIG. 3 shows a 3D schematic drawing of a pixel in the left graph, in comparison with a 3D schematic drawing of a kernel in the right graph.

Parameters for defining a kernel may be: the location of the kernel, the extent and orientation along coordinate dimensions (camera position, spatial extent), a parametric color function. The 3D-graphs in FIG. 3 show 3D schematic drawings of a pixel (left drawing) compared to a kernel (right drawing).

A model in the kernel domain is particularly useful for n≥4 because it allows to significantly reduce the redundancy.

It is an advantage of embodiments of the present invention that operations are performed in the parameter space of the model in contrast to traditional methods that operate in the pixel domain. Operations in the parameter space of the kernel-based model allow to heavily reduce the complexity of LF processing, editing, and rendering.

Figure 5:
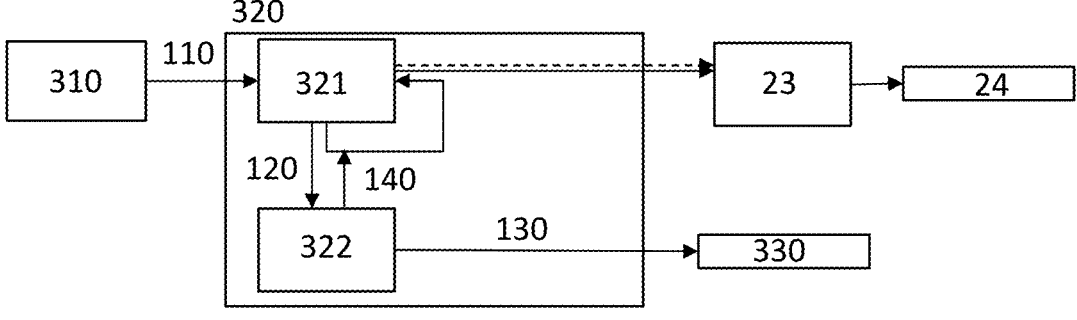
FIG. 5 shows a pipeline for light field rendering based on a kernel-based model with implicit depth information in accordance with embodiments of the present invention.

An exemplary method in accordance with embodiments of the present invention is illustrated in FIG. 5. In this example, and also in other embodiments an n-dimensional mixture model 321 of a light field is obtained 110 from the raw light field data. By sampling depth and color values and by light field rendering 23 a rendered view 24 may be obtained. In embodiments of the present invention the light field rendering is made more efficient by mathematically reducing 120 the model 321 to a single continuous viewpoint model 322 (the 2-dimensional model made of kernels). This is done in the parameter space 320. Thereby the method slices the n-dimensional model (e.g. transformed to correspond to the requested viewpoint) which yields a 2-D mixture-of-experts that corresponds to that single view. By kernel-wise or pixel-wise rendering 130, the rendered view 330 is obtained. The arrow 140 illustrates parameter adjustments and will be explained later in the description.

In embodiments of the present invention rendering may be done pixel-wise or kernel-wise. Kernel-wise rendering is enabled by the mathematical reduction into a 2-D mixture-of-experts, which is more efficient than pixel-wise rendering. The reason is that to enable real-time pixel-wise rendering, for each pixel the number of relevant kernels need to be determined and limited, this is what is called the kernel-relevance problem and is an expensive operation. This is not necessary in the case of kernel-wise rendering. The number of computations can thereby be reduced significantly. It is an advantage of kernel-wise rendering that the amount of computations can not only be reduced by the mathematical reduction, but also by the fact that a kernel can be spatially cut off as soon as the influence of it gets too small. The goal of the per-kernel rendering is to redefine the task of rendering in a different way, such that modern graphics hardware can be leveraged to execute the rephrased task. It is an advantage of embodiments of the present invention that they allow elegant integration with a graphics pipeline by using the model's kernels as drawing shapes.

Kernel parameters may describe orientation, and/or location, and/or depth, and/or color information, and/or size. Some of these parameters may be direct, others indirect. The depth can for example be derived or estimated from the orientation and/or location. Orientation, location and color information may for example be directly obtainable. A kernel may for example be characterized by its center, its covariance matrix, its center color, and its color gradient matrix. The covariance matrix describes the shape of the kernel. This may comprise the orientation and size of the kernel.

Methods according to embodiments of the present invention may comprise editing 140 the light field by adjusting one or more kernel parameters of at least one kernel. In embodiments of the present invention one or more kernel parameters of at least one kernel of the 2-dimensional model may be adjusted and the adjustment may be back-propagated to the corresponding kernel in the n-dimensional model. The back-propagation (for some parameters might) require analytically calculating the derivate of the 2-D parameter which is adjusted on the screen with respect to the original n-D parameter. It is an advantage of embodiments of the present invention that the light field is edited directly in the model-domain (parameter space). Thus, remodeling and hence, switching between the pixel-domain and the kernel-domain is avoided. In embodiments of the present invention the adjustments are done on the kernel parameters (not on the pixel data).

It is an advantage of embodiments of the present invention that the editing is view consistent as a change in one view will be reflected in many views (as a kernel is visible in a range of views).

Operations may be performed on the kernel parameters before slicing and sampling in order to simulate virtual camera operations such as simulating Depth-of-Field (DoF) effects, and various depth-based filtering applications.
In embodiments of the present invention kernels may be selected based on their kernel parameters and/or derivates of the kernel parameters. Selecting kernels may for example be done based on their depth in a scene, and/or based on their color, and/or based on their location and/or based on their shape and/or based on any other useful combination of parameters. When clustering on depth, the kernels which are on a same depth may be selected. In some embodiments of the present invention the method is adapted for selecting an object in a scene (e.g. a bottle on a table). This may be enabled because it is known that the object is at a specific depth. The object may be described by a plurality of kernels. Therefore, in embodiments of the present invention the method is configured for selecting all kernels of an object. The object may have a similar color over its complete surface. Embodiments of the present invention may be configured for clustering on color and/or on depth and/or close proximity. The latter prevents that kernels are selected from an object which is further away from the object which should be selected.

When selecting kernels based on shape, kernels may for example be selected that have the same orientation, and/or the same size.

In embodiments of the present invention editing 140 the light field may be done on the selected kernels. In embodiments of the present invention rendering a view in the pixel domain from the 2-dimensional model made of kernels may be done in function of the selected kernels.

Editing may be done in real-time (for example, as will be explained later, when eye-tracking a user, the view may be changed depending on the direction the user is looking at) or it may be done off-line (e.g. off-line editing of the light field by an artist).

Editing the light field by adjusting the kernels may be used to approximate an out of focus effect. In the classical way of light field rendering there is only a limited number of camera positions. Recombination of the pictures of the different cameras is done such that the focus is changed to a desired focus. In the present invention, however, the visual data is represented by continuous representations. Hence, the need does not exist to combine the images of the different cameras, because these are replaced by a continuous model. In embodiments of the present invention a focus plane (distance with respect to the camera at which the content should be sharp) may be selected arbitrarily. A blur may be introduced on locations outside the focus plane. Hence, refocusing is not done in the classical way, and is approximated by introducing a blur on locations outside the focus plane by changing the covariance matrix of a kernel depending on the depth of the kernel. The kernels may be adjusted such that their spatial size is increased. This will result in blending of the colors of kernels. By decreasing the size of the kernels hard edges are created, while by increasing the size of the kernels softer edges are created. This way allows to approximate an out of focus effect. Although this is an approximation, it is fast.

In embodiments of the present invention an eye-tracker may be used for tracking eye movement of a user. This allows to determine the FOV and/or depth where a user is looking/focusing at. This allows to select the kernels in this FOV and/or depth and those outside the FOV and/or depth. Next, editing can be done such that blurring is applied outside the FOV and/or depth.

In embodiments of the present invention the mathematical reduction may be done real-time for each frame on all the kernels. During the real-time operation the kernels may for example be enlarged for adding the out of focus effect. Also other parameters may be changed. These real-time parameter changes may be considered as part of the kernel-wise or pixel-wise rendering.

Operations that mimic depth-of-field and in general depth-based operations can be performed by manipulating the kernel parameters. A single kernel typically corresponds to a part of a physical object in the scene. Each kernel can thus be assigned a depth value, or the depth value can be derived from its parameters. Therefore, kernels can be selected that correspond to a certain depth. This allows for setting depth-based filtering.

It is an advantage of embodiments of the present invention that editing of light field models is made possible within the parameter space without having to go back-and-forth the pixel-domain. Light fields can be edited in a multi-view consistent manner as the kernel represents a large number of coherent samples. Editing is typically performed on 2-D views based on the 2-D view model. To enable this, adjustments to the parameters of the 2-D kernels are mapped back to the n-D kernels in the original n-D model.

It is an advantage of embodiments of the present invention that mathematical reduction allows for real-time rendering due to significantly reducing the computational demand (implicit kernel-selection). This enables for example kernel-wise rendering.

It is, moreover, advantageous that there is no need to convert between the kernel and pixel domain in order to perform LF processing (such as depth-based filtering, DoF effect) and editing.

It is, moreover, advantageous that multi-view consistent editing is enabled. As the kernel represents a large number of samples of the light field, changing a kernel's parameters consistently influences a wide range of viewpoints.

Kernel-wise rendering, moreover, removes the kernel-selection problem that is present in pixel-wise rendering. Kernel-wise rendering allows to use common and efficient functionalities in the graphics pipeline. In other words, it allows for more efficient and better rendering.

Figure 6:
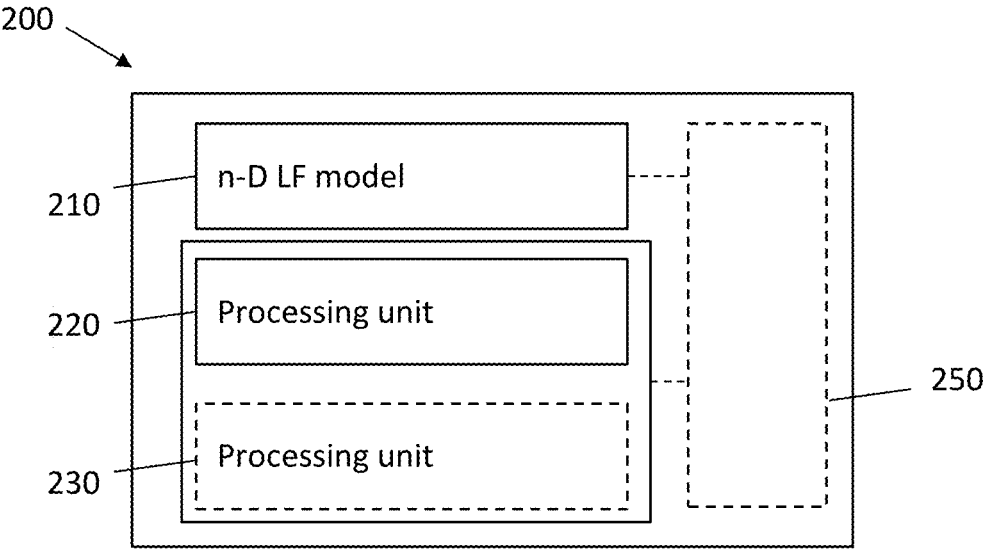
FIG. 6 shows a schematic drawing of a device in accordance with embodiments of the present invention.

In a second aspect embodiments of the present invention relate to a device 200 for light field rendering. Such a device is configured for executing a method in accordance with embodiments of the present invention. A schematic drawing of an exemplary embodiment of such a device is illustrated in FIG. 6. The device comprises:

an interface 210 for obtaining an n-dimensional mixture model, with n a natural number equal to or larger than 4, of a light field, wherein the model is a model made of kernels wherein each kernel represents light information and is expressed by parameter values, a processing unit 220 configured for mathematically reducing the n-dimensional model into a 2-dimensional mixture model of an image given a certain point of view, wherein the 2-dimensional model is also made of kernels, a processing unit 230 configured for rendering a view in the pixel domain from the 2-dimensional model made of kernels.

In embodiments of the present invention the interface may be a memory interface with a memory wherein the model is stored. In embodiments of the present invention the device may be configured for obtaining the light field and for calculating the model therefrom. This may be done on a graphics processing unit or on a separate processor.

In embodiments of the present invention the interface may be an interface with a camera configuration.

The processing unit configured for mathematically reducing the n-dimensional model into a 2-dimensional model may be a processor in general or it may be the graphics processing unit (GPU). The result of the reduction may be used by the GPU for further processing.

Also the processing unit configured for rendering a view in the pixel domain from the 2-dimensional model made of kernels may be a processor in general. In some embodiments the processor for the reduction may be the same as the processor for the rendering. This is, however, not strictly necessary. In embodiments of the present invention the processing unit for the rendering may be the GPU. The processing units in FIG. 6 may hence be replaced by one processing unit (e.g. the GPU). The device for light field rendering may moreover comprise a processor 250 for controlling the one or more processing units. The processor 250 may be configured to transfer the n-D model to the graphics processing unit, with additional parameters that define the viewpoint and viewing angles. The graphics processing unit may be configured for mathematically reducing the n-dimensional model into a 2-dimensional model of an image, given the view parameters received from the processor, and subsequently rendering the image using the reduced 2-d model, wherein the models mentioned are in the kernel domain. An optimal efficiency is obtained if the reduction is implemented in the GPU. The invention is, however, not limited thereto. For editing the model, the processor 250 may for example do some of these calculations as well in order to update the parameters in n-D correctly (n may for example be equal to 4).

Rendering may be done pixel-wise or kernel-wise. As discussed before a more efficient implementation can be obtained when rendering kernel-wise.

In embodiments of the present invention where the reduction from the n-dimensional mixture model into the 2-dimensional mixture model is done by the GPU, this may be implemented in the geometry shader.

A device 200 according to embodiments of the present invention may comprise a processor unit configured for editing the light field by adjusting one or more kernel parameters of at least one kernel. This may for example be the GPU.

A device 200 according to embodiments may comprise a processing unit which is configured selecting kernels based on their kernel parameters and/or derivatives of the kernel parameters. This may for example be the GPU.

In embodiments of the present invention the processor unit which is configured for editing the light field is configured for editing the light field on the selected kernels.

In a third aspect embodiments of the present invention relate to a computer program product for, if implemented on a processing unit, performing a method according to embodiments of the present invention.

In the following paragraphs a detailed example is given of the mathematical reduction and of the rendering. In embodiments of the present invention the model is a model in the kernel domain such as a steered mixture of experts. The next paragraph describes the model used in the steered mixture of experts (SMoE) framework.

SMoE is a mixture of experts based on Gaussian Mixture Models (GMM), used to model camera-captured visual data. In case of planar light fields, this data has four intrinsic dimensions cx (camera-x), cy (camera-y), px (pixel-x), py (pixel-y). More specifically, when considering a two-dimensional array of cameras on a plane, every camera has a (cx; cy) coordinate in that plane. Each camera takes a picture where every pixel has a (px; py) coordinate. Thus, every recorded sample (i.e.: pixel) has a four-dimensional identifying coordinate (cx; cy; px; py) with a corresponding color value (cr; cg; cb). In this coordinate space example first camera dimensions, then pixel dimensions are given.

Every kernel, hereinafter referred to as a component, of the model locally approximates the color data of the recorded samples. Locally thereby refers to the fact that multiple components interact with each other, as every component is infinite in size, but its weight decreases with increasing distance from its center point. At a given point in the four-dimensional coordinate space, the weights of all components is calculated and used to obtain the weighted average of their approximation functions, which yields the final color for that point. The approximation function of such component can be constant, linear, or even non-linear. When combining enough components, covering the entire region of captured samples, a full, high-quality model can be constructed.

In embodiments of the present invention multivariate normal distributions may be used as weight functions with linear approximation functions. Component i is characterized by its center $\mu_i \in \mathbb{R}^4$, its covariance matrix $R_i \in \mathbb{R}^{4 \times 4}$, its center color $\xi_i \in \mathbb{R}^3$, with the corresponding color gradient matrix $W_i \in \mathbb{R}^{3 \times 4}$, and an additional weight-scaling factor $\alpha_i \in \mathbb{R}$. The weight $\gamma_i \in \mathbb{R}$ for component i at position $x \in \mathbb{R}^4$ is given by a scaled multivariate normal distribution:

$$\gamma_i(\vec{x}) := \alpha_i \sqrt{|R_i|} \mathcal{N}(\vec{x} : \vec{\mu}_i, R_i) \tag{1}$$

$$= \alpha_i \exp\left(-\frac{1}{2}(\vec{x} - \vec{\mu}_i)^T R_i^{-1}(\vec{x} - \vec{\mu}_i)\right). \tag{2}$$

In this exemplary method according to embodiments of the present invention the weight is purposely rescaled with $\sqrt{|R_i|}$ such that the choice $R_i$ does not influence the amplitude of the weights.

In this exemplary method according to embodiments of the present invention, moreover, the typical normalization factor found in k-variate normal distributions is dropped, as the weighted average across the K components of the mixture model, which yields the final color $f(\vec{x}) \in \mathbb{R}^3$, will normalize the values anyway:

$$\vec{f}(\vec{x}) := \frac{\sum_{i=0}^{K-1} \gamma_i(\vec{x}) \vec{f}_i(\vec{x})}{\sum_{i=0}^{K-1} \gamma_i(\vec{x})}, \tag{3}$$

where $\vec{f}_i$ denotes the linear approximation function of the i-th component:

$$\vec{f}_i(\vec{x}) := \vec{\xi}_i + W_i(\vec{x} - \vec{\mu}_i). \tag{4}$$

In embodiments of the present invention the steered mixture of experts is used as model to approximate the visual data, recorded in the form of 4D-position 3D-color samples, captured by the cameras.

The components of the mixture model will decorrelate the data: consider an object that can be seen by all cameras. This object probably has very similar perceived colors for all these cameras. Therefore it can be modelled with some components that all model the corresponding samples recorded by the leftmost top camera to the rightmost bottom camera. Note that the projected pixel coordinates on the camera sensor have a linear relation to the camera coordinate. This is due to the assumed use of rectilinear lenses (or equivalently using corrected images using a lens-distortion model). Parallax is the effect of objects at different depths (i.e. distances from the camera) moving at different speeds across the field of view when moving the point of view left or right. Objects at a close distance to the cameras will have a greater parallax, compared to objects far away from the cameras. This parallax effect is linear, which lends it to be modelled with a mixture model, like SMoE. SMoE explicitly models this linearity. This has as advantage that it is possible to query the SMoE model in between original camera positions: due to the linearity, SMoE will produce very feasible interpolations, with highly consistent quality.

Equation (3) allows to evaluate a SMoE model at arbitrary positions if the model parameters are known.

The most straightforward way is to implement equation (3) as-is in code for CPU or GPU whereby, during operation, the formula is evaluated for every pixel on the screen. In order to evaluate one pixel, all components' weights need to be computed using eq. (1), and be used to calculate a weighted average of their approximation functions. This approach will obviously result in very poor performance, with increasing output resolution and increasing number of model components. The complexity can be denoted as O(KN), with K again the number of components, and N the number of output pixels.

This performance issue may be circumvented by building small SMoE models, each approximating a small 4D tile of the light-field data. When rendering, performance is then not longer an issue, as now every SMoE model had a very limited amount of components. When cutting the model in b blocks, complexity becomes:

$$O\left(\frac{K}{b}\frac{N}{b}b\right) = O(b^{-1}KN)$$

which is indeed faster.

However, this approach takes away some nice features of SMoE: reduced exploiting of redundancy in the modeling (more components are needed as objects will span multiple blocks, and thus the K needlessly increases again), less semantically meaningful component boundaries (blocks boundaries are cutting through objects in the light field data), depth information is now potentially lost due to block boundaries.

A method in accordance with embodiments of the present invention implements efficient preprocessing of the model parameters on a per-component basis. This enables efficient rendering, which may for example be implemented on state of the art GPU pipeline.

In embodiments of the present invention the n-dimensional model is mathematically reduced into a 2-dimensional model corresponding to a specific virtual view. An example of how this can be done is explained in the following paragraphs.

In this exemplary method according to embodiments of the present invention the following definitions and conventions are maintained. Cameras are described by two matrices: their transformation matrix $M \in \mathbb{R}^{4\times4}$ which describes the orientation of the camera with homogeneous coordinates; and their projection matrix $P \in \mathbb{R}^{3\times4}$ which transforms from 3D-homogeneous camera-coordinates to 2D homogeneous camera-sensor coordinates. More specifically:

Cameras look in the −z direction (0; 0; −1; 0), such that M. (0; 0; −1; 0) corresponds to the world coordinate space homogeneous direction in which the camera looks. Their up-direction is the +y direction (0; 1; 0; 0).

The camera sensor coordinate space is two dimensional, with of course the extra homogeneous component. The sensor x and y coordinate range from −1 to +1.

This means that projecting a 3D world-coordinate point $\vec{w}$ onto sensor coordinates $\vec{\rho}$ boils down to:

$$\vec{\rho}^f := PM^{-1}\langle \vec{\omega}|1\rangle \in \mathbb{R}^3 \tag{5}$$

$$\vec{p} := (p'_x/p'_z, p'_y/p'_z) \in \mathbb{R}^2, \tag{6}$$

where $\langle \vec{w}|1\rangle$ is the vector $\vec{w}$ augmented with a fourth component equal to 1. Without loss of generality, it can be assumed that the third row of P equals (0; 0; 1; 0), such that:

$$(P\vec{x})_z = x_z, \forall \vec{x} \in \mathbb{R}^4, \tag{7}$$

where $(\cdot)_z$ denotes taking the z-component (i.e. third component) of the vector argument. Additionally a custom notation for constructing submatrices is introduced. Given matrix A, $$A^{(\langle rows\rangle\,\langle columns\rangle)}, \tag{8}$$

is made of the rows and column indicated in the superscript, where ⟨rows⟩ is denoted by letters; and ⟨columns⟩ is denoted by 1-indexed numbers. For example: $A^{(xz24)}$ denotes the result when discarding all rows except for the x and z row, which is the 1st and 3rd row, and discarding all but the 2nd and 4th column. However, this notation will always be clarified explicitly when used again.

Figure 7:
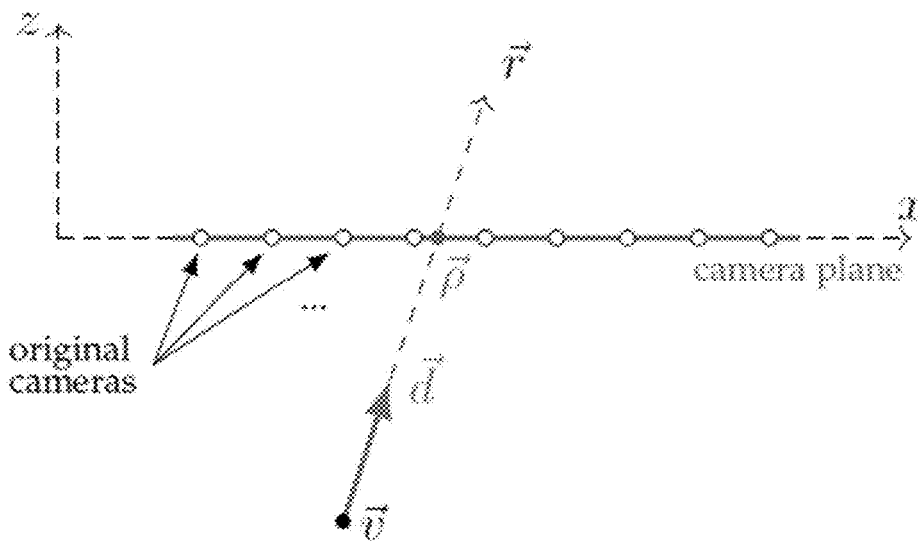
FIG. 7 show a 2D-view of cameras on an XZ-plane, a viewpoint $\vec{v}$ of a virtual camera, and a camera position $\vec{\rho}$ for a ray direction $\vec{d}$ to illustrate how to query the n-dimensional mixture model in accordance with embodiments of the present invention.

Mathematically reducing the n-dimensional model into a 2-dimensional model of an image given a certain point of view according to an exemplary method of the present invention is explained in the following paragraphs. In this exemplary embodiment the n-dimensional model is a queryable 4D-SMoE model of which the cameras were all on the xy-plane. Given a viewpoint $\vec{v}$ of a virtual camera, a ray can be shot along a direction $\vec{d}$ which corresponds to a certain pixel on the virtual camera from this viewpoint and intersect it with the camera plane z=0, such that a camera position $\vec{\rho}$ is obtained. The ray direction can be converted to the pixel position on the original cameras by considering the optics of the recording cameras. The combination of the xy-coordinate of the camera and the xy-coordinate of the pixel can be used to query the model. The intersection of the ray with the camera plane is visualized in a top-down view in FIG. 7.

This procedure can be repeated for every pixel of the virtual camera. Finding the point where to query the 4D-SMoE model for every pixel on the virtual camera will form a two-dimensional surface in the four-dimensional coordinate space of the model. The color values along this surface form exactly the image as seen by the virtual camera (assuming no volumetric effects influence the straight-line traveling of light).

Figure 8:
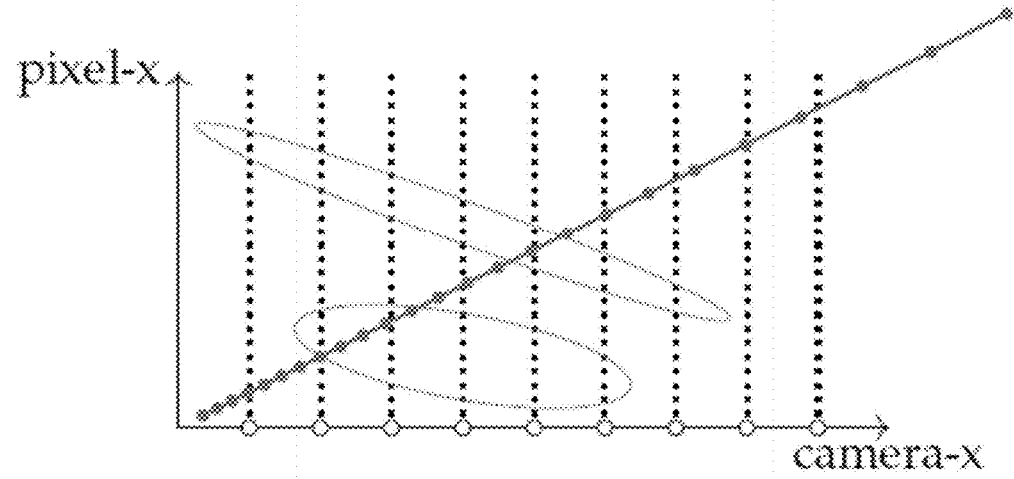
FIG. 8 shows the simulation of an intersection by sweeping through all the pixels of a virtual camera in a 2D-world, in accordance with embodiments of the present invention.

In order to visualize this surface, the equivalent setup in a two-dimensional world is considered (instead of a three-dimensional one like ours) with cameras, sitting on a one-dimensional line (instead of a plane), taking one-dimensional pictures (instead of two-dimensional pictures). Reconstructing the 1D image as seen by a virtual camera, on a 2D virtual viewpoint can be done as follows. The coordinates of the recorded samples are defined as camera-x and pixel-x. When applying the ray-plane intersection procedure for every pixel of the virtual camera, one finds the query points in the 2D model, as illustrated by FIG. 8. This figure shows a simulation of the intersection by sweeping through all the pixels of a virtual camera, in a 2D world. The hollow circles on the camera-x axis represent the x-coordinate of the positions of the 9 original cameras. The dotted lines represent the 1D pictures they have taken. The thick line is the mapping surface, and the dots on it are the corresponding query points in the 2D-model, corresponding to the 25 pixels of the virtual camera. The two ellipses represent example components from the model (by means of their region of influence).

Although the mapping surface turns out to be linear, the query points are not equally spaced.

Given the two-dimensional scenario illustrated in FIG. 8, the goal of the reduction method is to grab all the components, together with the mapping surface, and move and rotate them such that the mapping surface falls onto the pixel-x axis, while squeezing and stretching everything such that the unevenly distributed query points end up evenly distributed along the pixel-x axis. Once this is done, the actual intersection with the pixel-x axis (meaning camera-x equals zero), which gives the resulting 1D image as seen by the virtual camera. It is clear that the scale along the camera-x dimension is not really important as it can be considered that the result at camera-x is equal to zero. Notice how the pixel-x axis is being used as the actual pixel-x axis of the virtual camera after the transformation was applied.

Intersecting the camera plane may be achieved as follows. Consider a point $\vec{v}$: $=(v_x; v_y; v_z)\in \mathbb{R}^3$, for which a virtual camera viewpoint should be synthesized. Consider the ray $\vec{r}(\lambda)$ originating from this viewpoint $\vec{v}$ going into direction $\vec{d}\in \mathbb{R}^3$:

$$\vec{r}(\lambda) := \vec{v}+\lambda\vec{d} \in \mathbb{R}^3, \forall \lambda \in \mathbb{R}_{>0}. \qquad (9)$$

The plane of on which the cameras were positioned is described by following equation xy-plane or thus:

$$z=0. \qquad (10)$$

Solving the intersection of ray $\vec{r}(\lambda)$ with the camera plane for $\lambda$ yields:

$$\hat{\lambda}(\vec{d}) = -u_z/d_z. \qquad (11)$$

Evaluating this particular value of $\lambda$ in eq. (9) yields the position of the intersection $\vec{\rho}$:

$$\vec{\rho} := \vec{r}(\hat{\lambda}(\vec{d})), \qquad (12)$$

which can be interpreted as the 3D coordinate corresponding to the camera (assuming the plane was densely covered with infinite cameras) which captured the light ray we are after. Next the sensor-coordinate $\vec{s_o}$ of the ray under investigation for the selected camera is obtained. This is done by projecting the ray direction $\vec{d}$ onto that camera using its $P_o$ and $M_o$ matrices, now annotated with an 'o' for 'original camera':

$$\vec{s_o'} := P_oM_o^{-1}\langle\vec{d}|0\rangle \in \mathbb{R}^3 \qquad (13)$$

$$\vec{s_o} := \left(s_{o,x}'/s_{o,z}', s_{o,y}'/s_{o,z}'\right) \in \mathbb{R}^2. \qquad (14)$$

Combining $\vec{\rho}$ and $\vec{s_o}$ into one vector $\vec{q}=(\rho_x; \rho_y; s_{o,x}; s_{o,y})\in \mathbb{R}^4$ gives a vector that can be used to evaluate the SMoE model of eq. (3). Note that the sensor coordinates $\vec{s}$ might range from 0 to ⟨image size⟩ −1, depending on how one chooses to define the pixel coordinates $(p_x; p_y)$ of the original pictures taken by the camera, but nevertheless, all these details should be captured in $P_o$.

In conclusion a 4D coordinate in which to evaluate (or 'query') the SMoE model to find the color of a light ray as seen from $\vec{v}$ in direction $\vec{d}$ is derived. This coordinate can be defined as a function $\vec{q}$ for 'query point':

$$\vec{q}(\vec{v},\vec{d}):=(\rho_x,\rho_y,s_{o,x},s_{o,y})\in \mathbb{R}^4. \qquad (15)$$

The mapping from eq. (15) can be used to evaluate the model for every ray direction in the field of view of a virtual camera viewpoint, and by doing so the virtual viewpoint can be synthesized. This is a 'per-pixel approach' to synthesizing a virtual viewpoint. Assuming a virtual camera projects its field of view on both axes onto the range −1 to +1, the auxiliary function $\vec{d}$ can be introduced which constructs the ray direction vector that corresponds to a sensor coordinate $\vec{s}$ on the virtual camera:

$$\vec{d}(\vec{s}):=M^{(xyz123)}\tilde{P}^{-1}\langle\vec{s}|1\rangle \in \mathbb{R}^3. \qquad (16)$$

Here, $M^{(xyz123)}\in \mathbb{R}^{3\times3}$ denotes the upper left 3×3 submatrix of M, which contains the rotational aspect of the M matrix of the virtual camera. Remember that the translational component is actually described by $\vec{v}$. Next, $\tilde{P}^{-1}\in \mathbb{R}^{3\times3}$ is a 'functional inverse' of the projection matrix P. This means that:

$$P\cdot\langle \tilde{P}^{-1}\vec{x}|0\langle =\rangle \vec{x}|0\rangle, \forall\vec{x}\in \mathbb{R}^3. \qquad (17)$$

In eq. (16), $\tilde{P}^{-1}$ is used to construct a ray direction from a given sensor coordinate if augmented with third component 1, after which this direction vector is rotated along with the camera orientation. Note that the combination of eqs. (7) and (17) yields:

$$\left(\tilde{P}^{-1}\vec{x}\right)_z = x_z, \forall\vec{x}\in \mathbb{R}^3. \qquad (18)$$

Next $\vec{q_s}$ is introduced which maps the sensor coordinate $\vec{s}$ to the query point:

$$\vec{q_s}(\vec{s}) := \vec{q}(\vec{v}, \vec{d}(\vec{s})), \forall\vec{s} \in [-1, +1]^2, \qquad (19)$$

Using this new function it is easy to define the function $\vec{f_s}$ describing the color for every sensor coordinate:

$$\vec{f_s}(\vec{s}) := \vec{f}(\vec{q_s}(\vec{s})), \forall\vec{s} \in [-1, +1]^2. \qquad (20)$$

In embodiments of the present invention the n-dimensional model is mathematically reduced into a 2-dimensional model of an image given a certain point of view. In the next paragraphs is explained how, for an exemplary embodiment of the present invention a 2D-SMoE model is obtained which replaces $\vec{f_s}$. In the 2D-SMoE model every component is two dimensional and the entire model describes the virtual viewpoint that should be synthesized. As will be explained later it is an advantage of embodiments of the present invention that such a model can be efficiently rendered on screen.

Therefore the 4D model component is mapped one to one to 2D model components. In embodiments of the present invention this may be achieved by retrieving for the i-th component, a center $\mu_i\in \mathbb{R}^2$, a covariance matrix $\hat{R}_i\in \mathbb{R}^{2\times2}$, a center color $\xi_i\in \mathbb{R}^3$ with the corresponding slope matrix $W_i\in R^{3\times4}$, and an additional weight-scaling factor $\alpha_i\in \mathbb{R}$.

The mapping function from eq. (15) describes a 2D surface through the 4D space of the original model, which is referred to as 'the mapping surface'. Every component intersects with that surface, as every component is infinite in size. Just like eq. (20) evaluates the color on the surface described by the mapping function, the weight and color function of every component on that surface can be evaluated:

$$\gamma_{s,i}(\vec{s}) := \gamma_i(\vec{q_s}(\vec{s})), \forall \vec{s} \in [-1, +1]^2, \tag{21}$$

$$\vec{f}_{s,i}(\vec{s}) := \vec{f}_i(\vec{q_s}(\vec{s})), \forall \vec{s} \in [-1, +1]^2. \tag{22}$$

Given that $\gamma_i$ is a multivariate normal distribution given by eq. (1), the intuitive goal is to use the distribution conditioned on the mapping surface. Unfortunately one can only condition on axes. Problems are that conditioning should be done along a surface, which is not axis aligned, and does not have a uniform density (i.e.: the mapping is non-linear). A method according to embodiments of the present invention approximates the mapping linearly and then applies an affine transform to both the plane and the multivariate normal distribution such that the plane is now axis aligned. This allows for conditioning the distribution. The result is a bivariate normal distribution with a center point and covariance matrix in virtual camera sensor coordinates.

For the linear approximation of the mapping, in embodiments of the present invention, a first-order Taylor expansion may be used. The invention is, however, not limited thereto. The linear approximation implies that a point on the mapping surface is required to which the tangent plane can be constructed. This procedure is repeated for every component, as the tangent plane can be chosen optimally per component. In embodiments of the present invention the point on the mapping surface that maximizes the weight, or equivalently minimizes the Mahalanobis distance to the component may be chosen:

$$\vec{s}_{opt} := \operatorname*{argmax}_{\vec{s}} \gamma_{s,i}(\vec{s}) \tag{23}$$

$$= \operatorname*{argmin}_{\vec{s}} (\vec{q}_s(\vec{s}) - \vec{\mu}_i)^T R_i^{-1} (\vec{q}_s(\vec{s}) - \vec{\mu}_i). \tag{24}$$

Once $\vec{s}_{opt}$ is found, the mapping function determines the point to which the tangent plane will be constructed, cfr. eq. (19).

In the following paragraphs is explained how the minimization in eq. (24) may be done, yielding the tangent point around which the tangent plane can be constructed. It is also explained how the derivatives at the tangent point may be calculated to construct the per-component transform. Next, a possible implementation for constructing the actual transformation per component is given. Next, this transformation is applied and the dimensionality is reduced from 4 to 2.

This paragraph explains how the minimization of the Mahalanobis distance in eq. (24) may be done. The minimization happens with respect to $\vec{s}$, however, eq. (16) defines a mapping between $\vec{d}$ and $\vec{s}$. $\vec{d}$ is the ray direction, and it is defined up to a positive scaling factor. This freedom can be removed by rescaling such that 1 is obtained for the z-component. However, if this factor turns out to be negative, the ray direction would invert. This is not intended, as this means the virtual camera looks away from the plane of cameras. When building the actual implementation, this must be checked, and the result discarded. If this issue does not occur, a 1-to-1 mapping between the 'normalized ray direction' $\vec{d}_n$ and the sensor coordinate s can be defined:

$$\vec{d}_n(\vec{s}) := (\vec{d}(\vec{s}))_{xy} / (\vec{d}(\vec{s}))_z \in \mathbb{R}^2 \tag{25}$$

$$\vec{s}'(\vec{d}_n) := PM^{-1} \langle \vec{d}_n | 1 | 0 \rangle \in \mathbb{R}^3 \tag{26}$$

$$\vec{s}(\vec{d}_n) := (\vec{s}'(\vec{d}_n))_{xy} / (\vec{s}'(\vec{d}_n))_z \in \mathbb{R}^2. \tag{27}$$

This means that eq. (24) can be optimized with respect to $\vec{d}_n$ instead.

Next, in this exemplary embodiment of the present invention, all the original cameras are assumed to be organized on the z-plane with identical orientation looking into the world-space $-z$ direction. This means that the upper left 3×3 part of their $M_o$ is the identity matrix, and only the fourth column is different, containing the translation component (i.e., the camera position). However, as can be seen in eq. (13), the fourth component equals zero, which causes eq. (13) to simplify to:

$$\vec{s}'_o = P_o \langle \vec{d} | 0 \rangle \in \mathbb{R}^3,$$

in which $\vec{d}$ can be substituted with eq. (16), which then again, using both eqs. (7) and (18), leads to:

$$\vec{s}'_o = P_o \langle \bar{P}^{-1} \langle \vec{s} | 1 \rangle | 0 \rangle \tag{29}$$

$$s'_{o,z} = 1. \tag{30}$$

Eq. (19) can be expressed as a function of $\vec{d}_n$ by choosing $\vec{d} = \langle \vec{d}_n | 1 \rangle$, which gives:

$$\begin{aligned}
\vec{q}_s(\vec{s}) = \begin{bmatrix} \rho_x \\ \rho_y \\ s_{o,x} \\ s_{o,y} \end{bmatrix} &= \begin{bmatrix} v_x - (v_z/d_z)d_x \\ v_y - (v_z/d_z)d_y \\ s'_{o,x}/s'_{o,z} \\ s'_{o,y}/s'_{o,z} \end{bmatrix} = \begin{bmatrix} v_x - v_z \vec{d}_{n,x} \\ v_y - v_z \vec{d}_{n,y} \\ s'_{o,x} \\ s'_{o,y} \end{bmatrix} \\[2ex]
&= \begin{bmatrix} v_x - v_z \vec{d}_{n,x} \\ v_y - v_z \vec{d}_{n,y} \\ P_o^{(x123)} \vec{d} \\ P_o^{(y123)} \vec{d} \end{bmatrix} = \begin{bmatrix} -v_z & 0 \\ 0 & -v_z \\ P_o^{(x1)} & P_o^{(x2)} \\ P_o^{(y1)} & P_o^{(y2)} \end{bmatrix} \vec{d}_n + \begin{bmatrix} v_x \\ v_y \\ P_o^{(x3)} \\ P_o^{(y3)} \end{bmatrix} \\[2ex]
&= D \cdot \vec{d}_n(\vec{s}) + \vec{e}.
\end{aligned} \tag{31}$$

Here, the notation $A^{(x123)} \in \mathbb{R}^{1 \times 3}$ is used to denote the 1×3 matrix containing the elements of columns 1, 2, 3 at the first (x) row of A. Likewise, $A^{(y3)} \in \mathbb{R}$ is the element of A at the second row, third column, etc. . . . . .

Considering the minimization objective of eq. (24), this can be rewritten by minimizing over $\vec{d}_n$, while introducing an auxiliary function $\vec{u}(\vec{d}_n)$:

$$\vec{d}_{n,opt} = \operatorname*{argmin}_{\vec{d}_n} (\vec{u}(\vec{d}_n))^T R_i^{-1} (\vec{u}(\vec{d}_n)) \tag{32}$$

$$\vec{u}(\vec{d}_n) := D \cdot \vec{d}_n(\vec{s}) + \vec{e} - \vec{\mu}_i. \tag{33}$$

Next the derivative of the minimization objective in eq. (32) is calculated and set equal to zero, while using the fact that $R_i$ and $$R_i^{-1}$$

are symmetrical. Doing this using numerator layout gives:

$$\vec{0}^T = 2\left(\vec{u}(\vec{d}_n)\right)^T R_i^{-1} \frac{\partial \vec{u}(\vec{d}_n)}{\partial \vec{d}_n} \qquad (34)$$

$$\Longleftrightarrow \vec{0}^T = \left(D\vec{d}_n + (\vec{e} - \vec{\mu}_i)\right)^T R_i^{-1} D$$

$$\Longleftrightarrow D^T R_i^{-1} D\vec{d}_n = -D^T R_i^{-1}(\vec{e} - \vec{\mu}_i)$$

$$\Longleftrightarrow \vec{d}_{n,opt} = -\left(D^T R_i^{-1} D\right)^{-1} D^T R_i^{-1}(\vec{e} - \vec{\mu}_i).$$

Note that the second equivalence transposes both sides of the equation. Finally, the optimal $\vec{s}_{opt}$ by combining eqs. (16) and (17), and remembering that the z-component of $\vec{d}$ is fixed to 1:

$$\vec{s}_{opt} = (P\langle \vec{d}_{n,opt} | 1 \rangle)_{xy}, \qquad (35)$$

or equivalently, the corresponding optimal 'query point' $\vec{q}_{opt}$ to which the tangent plane may be constructed in accordance with embodiments of the present invention:

$$\vec{q}_{opt} = \vec{q}(\vec{v}, \langle \vec{d}_{n,opt} | 1 \rangle),$$

or equivalently, using eq. (31):

$$\vec{q}_{opt} = D\vec{d}_{n,opt} + \vec{e}. \qquad (36)$$

Given the tangent point $\vec{q}_{opt}$ in eq. (36), the orientation of the plane can be obtained. As discussed earlier, this may be achieved using a first-degree Taylor expansion of the mapping function $\vec{q}_s(\cdot)$ from eq. (19) around the tangent point. Therefore, the derivative $G \in \mathbb{R}^{4 \times 2}$ of $\vec{q}_s(\vec{s})$ with respect to $\vec{s}$:

$$G := \frac{\partial \vec{q}_s}{\partial \vec{s}} = \frac{\partial \vec{q}_s}{\partial \vec{d}_n} \frac{\partial \vec{d}_n}{\partial \vec{s}} \qquad (37)$$

$$= D\left(\frac{1}{d_z} \frac{\partial \vec{d}_{xy}}{\partial \vec{s}} + \vec{d}_{xy} \frac{-1}{d_z^2} \frac{\partial d_z}{\partial \vec{s}}\right). \qquad (38)$$

In order to derive $$\frac{\delta \vec{d}_{xy}}{\delta \vec{s}} \text{ and } \frac{\delta \vec{d}_z}{\delta \vec{s}},$$

$\vec{d}_{xy}$ and $d_z$ may be rewritten in matrix form, using eq. (16):

$$\vec{d}_{xy}(\vec{s}) = M^{(xy123)} \tilde{P}^{-1}\left(I_{32}\vec{s} + \vec{e_3}\right) \qquad (39)$$

$$d_z(\vec{s}) = M^{(z123)} \tilde{P}^{-1}\left(I_{32}\vec{s} + \vec{e_3}\right), \qquad (40)$$

where $$I_{32} := \begin{bmatrix} 1 & 0 \\ 0 & 1 \\ 0 & 0 \end{bmatrix} \text{ and } \vec{e}_3 := \begin{bmatrix} 0 \\ 0 \\ 1 \end{bmatrix}.$$

The following derivatives can be obtained:

$$\frac{\partial \vec{d}_{xy}}{\partial \vec{s}} = M^{(xy123)} \tilde{P}^{-1} I_{32} \in \mathbb{R}^{2 \times 2}, \qquad (41)$$

$$\frac{\partial d_z}{\partial \vec{s}} = M^{(z123)} \tilde{P}^{-1} I_{32} \in \mathbb{R}^{1 \times 2}. \qquad (42)$$

Knowing the tangent point $\vec{q}_{opt}$, and the gradient matrix G the linear approximation of $\vec{q}_s$ can be identified:

$$\vec{q}_s(\vec{s}) \approx \vec{q}_{opt} + G(\vec{s} - \vec{s}_{opt}). \qquad (43)$$

The goal is to construct a transformation for every component of the mixture model such that, after transforming, the last two dimensions correspond to the two-dimensional $\vec{s}$ coordinate, when setting the first two dimensions to zero. If this is the case, the first two dimensions can be eliminated. For the multivariate normal distribution, this can be done by conditioning the first two dimensions to be zero. Using the same transformation, the corresponding color-gradient matrix $\hat{W}$ can be reconstructed. In an exemplary embodiment of the present invention the transform T: $\mathbb{R}^4 \rightarrow \mathbb{R}^4$ may be defined as follows:

$$T(\vec{x}) := A\vec{x} + \vec{b}, \qquad (44)$$

with $A \in \mathbb{R}^{4 \times 4}$ and $\vec{b} \in R^4$. The following equation should be satisfied:

$$T(\vec{q}_{opt} + G\vec{\Delta}) = \langle 0|0| \vec{s}_{opt} + \vec{\Delta} \rangle, \forall \vec{\Delta} \in \mathbb{R}^2. \qquad (45)$$

Solving this for A and $\vec{b}$ results in:

$$A = \begin{bmatrix} 1 & 0 \\ 0 & 1 \\ 0 & 0 \\ 0 & 0 \end{bmatrix} G \Bigg|^{-1}, \qquad (46)$$

$$\vec{b} = \langle 0 | 0 | \vec{s}_{opt} \rangle - A\vec{q}_{opt}. \qquad (47)$$

While solving this, one will notice there is some freedom caused by the fact that besides the first two coordinates being zero in eq. (45), it is not important how this transformation behaves everywhere else. The freedom is arbitrarily filled by the (4×2)-identity left submatrix in eq. (46).

The per-component transformation T in eq. (44), can be used to construct the corresponding 2D-model that represents the virtual camera view associated with the virtual viewpoint $\vec{v}$ and $M^{(xyz123)}$ and P matrices.

For notational convenience $$s^{(4)}_{opt} := \langle 0|0|\vec{s}_{opt}\rangle \text{ and } \vec{\Delta}^{(4)} := \langle 0|0|\vec{\Delta}\rangle \qquad (5)$$

are introduced. Transforming the multivariate normal distribution can be done by using a transformed center and covariance matrix:

$$\vec{\mu}'_i = A\vec{\mu}_i + \vec{b}, \qquad (48)$$

$$R'_i = AR_iA^T. \qquad (49)$$

Finding the adjusted color gradient matrix $W'_i$ and center color $\vec{\xi}'_i$, solving following equation:

$$\vec{f}_i(\vec{q}_{opt} + G\vec{\Delta}) = \qquad (50)$$
$$\vec{f}'_i(\vec{s}^{(4)}_{opt} + \vec{\Delta}^{(4)}) \Leftrightarrow \vec{\xi}_i + W_i(\vec{q}_{opt} + (G\vec{\Delta} - \vec{\mu}_i)) = \vec{\xi}'_i + \hat{W}_i(\vec{q}_{opt} + \vec{\Delta}^{(4)} - \vec{\mu}'_i).$$

In this linear equation, the equality of the linear component can be easily solved:

$$W_i G\vec{\Delta} = W'_i\langle 0\,|\,0\,|\,\vec{\Delta}\rangle \Leftrightarrow \hat{W}_i = W_iA^{-1}. \qquad (51)$$

Using this, solving the constant component:

$$\vec{\xi}_i + W_i(\vec{q}_{opt} - \vec{\mu}_i) = \qquad (52)$$
$$\vec{\xi}_i + W'_i(\vec{s}^{(4)}_{opt} - \vec{\mu}'_i) \Leftrightarrow \vec{\xi}_i + W_i(\vec{q}_{opt} - \vec{\mu}_i) = \vec{\xi}'_i + W_iA^{-1}(\vec{s}^{(4)}_{opt} - \vec{\mu}'_i) \Leftrightarrow \vec{\xi}'_i =$$
$$\vec{\xi}_i + W_i(\vec{q}_{opt} - \vec{\mu}_i) - W_iA^{-1}(\vec{s}^{(4)}_{opt} - \vec{\mu}'_i) \Leftrightarrow \vec{\xi}'_i =$$
$$\vec{\xi}_i + W_i(\vec{q}_{opt} - \vec{\mu}_i - A^{-1}(\vec{s}^{(4)}_{opt} - \vec{\mu}'_i)) \Leftrightarrow \vec{\xi}'_i =$$
$$\vec{\xi}_i + W_i(\vec{q}_{opt} - \vec{\mu}_i - A^{-1}(\vec{s}^{(4)}_{opt} - A\vec{\mu}_i - \vec{s}^{(4)}_{opt} + A\vec{q}_{opt})) \Leftrightarrow \vec{\xi}'_i = \vec{\xi}_i$$

Lastly, the components are sliced along the last two dimensions, such that the first two dimensions disappear because they are fixed to be zero, and the last two dimensions remain.

Slicing the multivariate normal distribution may be done by conditioning the distribution. Consider $\vec{x} = \langle x_c | x_s\rangle$, where subscripts c ('camera') and s ('screen') refer to the two first and two last dimensions respectively. Slicing may be done through the plane where 'camera' equals 0, such that the screen-dimensions remain.

Considering the mixing weight $$\gamma'_i(\vec{x})$$

of the transformed component (defined by $$\vec{\mu}_i, R'_i, \vec{\xi}'_i, \alpha_i),$$

the definition of conditional probabilities can be used:

$$\gamma'_i(\vec{x}) = \alpha_i\sqrt{|R'_i|}\,P(\vec{x}_c, \vec{x}_s) \qquad (53)$$
$$= \alpha_i\sqrt{|R'_i|}\,P(\vec{x}_c)P(\vec{x}_s|\vec{x}_c). \qquad (54)$$

Identifying the factors:

$$P(\vec{x}_c = \vec{0}) = \mathcal{N}\,(\vec{x}_c = \vec{0}; \vec{\mu}_{c,i}, R_{cc,i}) \qquad (57)$$
$$P(\vec{x}_s | \vec{x}_c = \vec{0}) = \mathcal{N}\,(\vec{x}_c; \vec{\mu}_i, \hat{R}_i), \qquad (58)$$

where, using conditioning of a multivariate normal distribution:

$$\hat{R}_i = R'_{ss,i} - R'_{sc,i}R'^{-1}_{cc,i}R'_{cs,i} \in \mathbb{R}^{2\times 2} \qquad (59)$$

$$\hat{\vec{\mu}}_i = \vec{\mu}'_{s,i} - R'_{sc,i}\,R^{-1}_{cc,i}\vec{\mu}'_{c,i} \in \mathbb{R}^2, \qquad (60)$$

where subscripts c and s again stand for 'camera' and 'screen'. E.g.:

$$R'_{sc,i}$$

refers to the 2×2 lower left submatrix of $$R'_i.$$

Note that $$R'^{-1}_{cc,i}.$$

is the matrix inverse of $$R'_{cc,i}.$$

Continuing on eq. (56), the following equations can be obtained:

$$\gamma_{s,i}(\vec{x}_s) = \alpha_i\sqrt{|R'_i|}\,P(\vec{x}_c = \vec{0})P(\vec{x}_s|\vec{x}_c = \vec{0}) \qquad (61)$$
$$= \frac{\alpha_i\sqrt{|R'_i|}\frac{1}{\sqrt{|R'_{cc,i}|}}\exp\left(-\frac{1}{2}\vec{\mu}'^T_{c,i}R'^{-1}_{cc,i}\vec{\mu}'_{c,i}\right)}{\frac{1}{\sqrt{|\hat{R}_i|}}\exp\left(-\frac{1}{2}\left(\vec{x}_s - \hat{\vec{\mu}}_i\right)^T\hat{R}^{-1}_i\left(\vec{x}_s - \hat{\vec{\mu}}_i\right)\right)}$$

-continued $$
= \frac{\alpha_i \exp\left(-\frac{1}{2} \vec{\mu}'_{c,i}{}^T R'^{-1}_{cc,i} \vec{\mu}'_{c,i}\right)}{\exp\left(-\frac{1}{2}\left(\vec{x}_s - \hat{\vec{\mu}}_i\right)^T \hat{R}_i^{-1}\left(\vec{x}_s - \hat{\vec{\mu}}_i\right)\right)},
$$

where in the last equality, all the square roots of the determinants cancel, as a property of determinants of block matrices and the fact that $\hat{R}_i$ is the Schur complement of the $$
R'_{cc,i}
$$

block of the $$
R'_i
$$

matrix. The color parameters can be obtained as follows:

$$
\hat{W}_i = W_i'^{(34)} \in \mathbb{R}^{3 \times 2}, \tag{62}
$$

$$
\hat{\vec{\xi}}_i = \vec{\xi}'_i - W_i'^{(12)}\vec{\mu}'_{c,i} + \hat{W}_i\left(\vec{\mu}'_i - \vec{\mu}'_{s,i}\right) \in \mathbb{R}^3. \tag{63}
$$

Here again, the superscripts select columns:

$$
W_i'^{(34)}
$$

selects the third and fourth column of the matrix $$
W_i'.
$$

In conclusion, the previous paragraphs present an example of mathematically reducing the n-dimensional model into a 2-dimensional model of an image given a certain virtual viewpoint. The parameters of a two-dimensional approximation model in eqs. (59) to (63) are derived. This two-dimensional model models the visual output image of a virtual camera. This means that the camera position, orientation, and projection matrix can be freely configured. Using above mathematics the corresponding 2D model can be derived, which we can then efficiently render on the screen.

Rendering a view in a pixel domain from the 2-dimensional model made of kernels is explained in the next section.

After deriving the parametrization for a two-dimensional model that approximates the view as seen from a virtual camera a technique to efficiently render 2D models on the screen is discussed in the following paragraphs. Such a technique may be implemented on a modern GPU graphics pipeline.

The exemplary technique, according to embodiments of the present invention, relies on the assumption that the 2D components can be spatially cut off, when the point considered is far enough from the component center $\vec{\mu}_i$. This means that the influence of the component can be neglected starting from a certain distance. When considering the two-dimensional equivalent of the weight function in eq. (1), one can see that as the Mahalanobis distance becomes large, the weight will become very small quickly. However, assuming that the model covers the entire range 'dense' enough with components; the normalization in eq. (3) could cause components with small weights to become important again if they are the only ones in a certain region. Therefore it may be assumed that the cut-off distance can be chosen reasonably small and every pixel of the resulting image is still covered by a component.

As mentioned before, a method in accordance with embodiments of the present invention may be built on a modern graphics pipeline. It may make use of the sequence of a vertex shader, a geometry shader, and a fragment shader, with two render passes using an intermediate render target (a.k.a.: frame buffer). Such pipelines can be found in libraries like OpenGL, Vulkan, Metal, Direct3D, etc. In the remainder of this section OpenGL terminology. The invention is, however, not limited thereto.

In the next paragraphs the first render pass represents the summation in the nominator from eq. (3). This pass accumulates all the weights and colors of the individual components for every pixel. The second render pass executes the normalization (i.e.: the division of eq. (3)) with the total weight, which also accumulated in the first render pass.

The accumulation pass accumulates the weights and colors of the components. This is done using the following steps:

1) Store the parameters of the 4D components in a vertex buffer, such that one vertex contains the attributes of one component, and there are as many vertices as components. Assuming the implementation likes multiples of four floats, one would need 9 four-vectors to store all the data for this 4D component.

2) The vertex shader passes these parameters as-is to the geometry shader.

3) The geometry shader is responsible for executing the required calculations described in the previous section to obtain the two-dimensional parameters for the current component. The parameters required to do this (like the viewpoint $\vec{v}$, the virtual camera model matrix M and projection matrix P, and the original cameras $P_o$ matrix) are all passed in as uniforms. With the resulting parameters, the geometry shader emits an n-gon, in the shape of an ellipse corresponding to the covariance matrix $\hat{R}_i$ and the chosen Mahalonbis-cut-off distance, using a triangle strip for example. The output vertices are attributed with their normalized position (see below), corresponding color, and weight. These triangles will be rasterized and the fragment shader will process each fragment (e.g.: pixel) to calculate the output color.

4) The fragment shader receives the interpolated normalized position and color vectors. The weight factor is constant, as it was constant for every vertex output by the geometry shader for a single component. The fragment shader uses the normalized position to calculate the actual weight $\gamma$ like eq. (1) where the covariance matrix is now the identity matrix, as the geometry shader used it to produce normalized position, such that the corresponding Mahalanobis distance simplifies to Euclidean distance. The output of the fragment shader is the four-vector ($\gamma$r; $\gamma$g; $\gamma$b; $\gamma$).

A 4-channel floating-point frame buffer (OpenGL: GL_RGBA32F) may be used to accumulate the weighted colors and weights. Notice how the alpha channel is used to accumulate the weight, and that the alpha channel can exceed 1. In this example the blending mode is set to additive (OpenGL: glBlendFunc(GL_ONE, GL_ONE)), such that weights and colors simply accumulate instead of being blended using alpha blending for example.

In step 3, the geometry shader should generate vertex positions for the calculated 2×2 covariance matrix $\hat{R}_i$, around $\hat{\bar{\mu}}_i$, This can be done by finding the transform that maps the unit-variance bivariate normal distribution to the bivariate normal distribution corresponding to covariance matrix $\hat{R}_i$. Then the coordinates on a circle with radius equal to the cut-off distance can be transformed, to form the required ellipse. Representing this transform by matrix $B \in \mathbb{R}^{2 \times 2}$, then the following condition should be satisfied:

$$\hat{R}_i = B I_2 B^T$$
$$= B B^T.$$

This may for example be achieved by choosing B to be the Cholesky decomposition of $\hat{R}_i$. Manually solving this for a 2×2 matrix can be done as follows:

$$B := \begin{bmatrix} a & 0 \\ b & c \end{bmatrix},$$

$$B B^T = \begin{bmatrix} a & 0 \\ b & c \end{bmatrix} \begin{bmatrix} a & b \\ 0 & c \end{bmatrix} = \begin{bmatrix} a^2 & ab \\ ab & b^2 + c^2 \end{bmatrix} = \hat{R}_i \quad (64)$$

$$\Rightarrow \begin{cases} a &= \sqrt{\hat{R}_{i,11}} \\ b &= \hat{R}_{i,12}/a \\ c &= \sqrt{\hat{R}_{i,22} - b^2} \end{cases} \quad (65)$$

Note that the points on the circle (which will be transformed by B) are the normalized positions of steps 3 and 4.

In this exemplary embodiment of the present invention the normalization pass divides the accumulated color by the accumulated weight for every pixel in the frame buffer. This can be done by rendering two triangles covering the entire screen, using a simple fragment shader that samples the frame buffer coming from the first render pass. The output is the division of the first three components and the fourth component. The destination for this render pass can be the screen frame buffer, or another frame buffer for further post-processing. For displaying the result, an 8-bit RGB color format may for example be used (OpenGL: GL_RGB8).

In embodiments of the present invention an n-dimensional model of a light field with n equal to or larger than 4. A light field video is, in terms of the model the same as a light field, but with one extra dimension (i.e.: n=5), being the time dimension.

The reduction of a 5-dimensional model to a 2-dimensional model is similar to the reduction of a 4-dimensional model to a 2-dimensional model where time is taken into account. This may be achieved similarly as described in the exemplary embodiment in the earlier paragraphs whilst taking into account the extra dimension. Alternatively it may be achieved by first reducing the 5-d model to a 4-dimensional model given the timestamp, and then apply the 4D-to-2D reduction.

In summary, in embodiments of the present invention views are rendered at arbitrary vantage points derived from the model parameters. Thereby the n-dimensional (n-D) model is used as a starting point. The n-D model is mathematically reduced to a 2-D continuous model that corresponds to a specific viewpoint specified by a position, gaze orientation. The 2-D view can then be rendered at a desired resolution using pixel-wise rendering (as known in the literature) or, more preferably, using a novel kernel-wise rendering method. The latter has the advantage of removing the so-called kernel-selection problem in pixel-wise rendering. In pixel-wise rendering, real-time rendering is achieved only when the number of kernels to evaluate per pixel is limited. Therefore, the relatively expensive kernel-selection process is performed for blocks of pixels a priori. The proposed kernel-wise rendering does not require the kernel-selection process and may work as follows. For each kernel an arbitrarily-shaped window can be defined in the output render. The shape of the window is intended to correspond to the region of influence of this kernel. This shape may then be rasterized using a conventional rasterization-based render pipeline (as typically found in GPUs). In this pipeline, for each fragment in the shape, the expert function for this specific kernel is evaluated and accumulated using the weight of the gating function for that pixel. In a second pass, the accumulated color values may be normalized, which results in the final render. Operations such as blurring can be performed by changing the kernel parameters so that the kernels are more overlapping, e.g. increasing the bandwidth of Gaussian kernels. As such, parts of the image modality can be blurred based on selecting the appropriate kernels to simulate the blur. Based on the orientation of the kernels, a depth can be derived that corresponds to the object from which the light originated. As such, kernels can be selected based on their depth. When combining per-kernel depth estimation and blurring, and given a desired focal plane, a depth-of-field effect can be simulated. In embodiments of the present invention light fields can be edited in a multi-view consistent manner (such that the eventual rendering is consistent for different point of views). Kernels represent light information, i.e. nearby and similarly oriented light rays that have a similar color. Changing the parameter values of the kernel representation thus changes all renders based on this kernel in a consistent manner. For example, changing the position or color of the kernel, will simulate moving the bundle of light or changing its color. Furthermore, kernel parameters can be used to cluster similar kernels together. As mentioned, the tangible kernel parameters describe shape, orientation, location, depth, and color information. Based on these parameters similar kernels can be grouped together and edited together.

The invention claimed is:

1. A method for light field rendering, the method comprising:

obtaining an n-dimensional mixture model, with n a natural number equal to or larger than 4, of a light field, wherein the model is made of kernels, wherein each kernel represents light information and is expressed by parameter values, mathematically reducing the n-dimensional mixture model into a 2-dimensional mixture model of an image, the 2-dimensional mixture model comprising a mapping of the n-dimensional mixture model onto a 2-dimensional surface associated with a selected viewpoint, wherein the 2-dimensional model is also made of kernels, rendering a view in a pixel domain from the 2-dimensional model made of kernels.

2. The method according to claim 1, wherein rendering the view in the pixel domain is done pixel-wise.

3. The method according to claim 1, wherein rendering the view in the pixel domain is done kernel-wise.

4. The method according to claim 1 wherein kernel parameters describe orientation, and/or location, and/or depth, and/or color information, and/or size.

5. The method according to claim 1 the method comprising editing the light field by adjusting one or more kernel parameters of at least one kernel.

6. The method according to claim 1, the method comprising selecting kernels based on their kernel parameters and/or derivates of the kernel parameters.

7. The method according to claim 6 wherein editing the light field is done on the selected kernels.

8. The method according to claim 6 wherein rendering a view in the pixel domain from the 2-dimensional model made of kernels is done in function of the selected kernels.

9. A non-transitory computer readable memory comprising a computer program product for, if implemented on a processing unit, performing the method of claim 1.

10. A device for light field rendering, the device comprising:

an interface for obtaining an n-dimensional mixture model, with n a natural number equal to or larger than 4, of a light field, wherein the model is a model made of kernels wherein each kernel represents light information and is expressed by parameter values, a processing unit configured for mathematically reducing the n-dimensional model into a 2-dimensional mixture model, the 2-dimensional mixture model comprising a mapping of the n-dimensional mixture model onto a 2-dimensional surface associated with a selected viewpoint, wherein the 2-dimensional model is also made of kernels, a processing unit configured for rendering a view in the pixel domain from the 2-dimensional model made of kernels.

11. The device according to claim 10, wherein the processing unit for rendering is configured for pixel-wise rendering of the view in the pixel-domain.

12. The device according to claim 10, wherein the processing unit for rendering is configured for kernel-wise rendering of the view in the pixel-domain.

13. The device according to claim 10, wherein a processor unit is configured for editing the light field by adjusting one or more kernel parameters of at least one kernel.

14. The device according to claim 13, wherein a processing unit is configured selecting kernels based on their kernel parameters and/or derivatives of the kernel parameters.

15. The device according to claim 14, wherein the processor unit which is configured for editing the light field is configured for editing the light field on the selected kernels.

* * * * *